(12) United States Patent
Lu et al.

(10) Patent No.: US 9,275,353 B2
(45) Date of Patent: Mar. 1, 2016

(54) EVENT-PROCESSING OPERATORS

(75) Inventors: Yanbing Lu, Arcadia, CA (US); Jerry Waldorf, West Hills, CA (US)

(73) Assignee: Oracle America, Inc., Redwood City, CA (US)

( * ) Notice: Subject to any disclaimer, the term of this patent is extended or adjusted under 35 U.S.C. 154(b) by 2191 days.

(21) Appl. No.: 11/938,013

(22) Filed: Nov. 9, 2007

(65) Prior Publication Data

US 2009/0125916 A1    May 14, 2009

(51) Int. Cl.
*G06F 3/00*    (2006.01)
*G06Q 10/04*    (2012.01)

(52) U.S. Cl.
CPC ..................................... *G06Q 10/04* (2013.01)

(58) Field of Classification Search
None
See application file for complete search history.

(56) References Cited

U.S. PATENT DOCUMENTS

| 7,257,611 | B1 | 8/2007 | Shankar et al. | |
|---|---|---|---|---|
| 2003/0065409 | A1* | 4/2003 | Raeth et al. | 700/31 |
| 2005/0171923 | A1* | 8/2005 | Kiiveri et al. | 707/1 |
| 2006/0282301 | A1 | 12/2006 | Olson | |
| 2007/0150585 | A1 | 6/2007 | Chkodrov | |

OTHER PUBLICATIONS

Arvind Arasu and Shivanth Babu and Jennifer Widom, Stanford University, "The CQL Continuous Query Language: Semantic Foundations and Query Execution", pp. 1-32, Published 2003.

* cited by examiner

*Primary Examiner* — H S Sough
*Assistant Examiner* — Carina Yun
(74) *Attorney, Agent, or Firm* — Brooks Kushman P.C.

(57) ABSTRACT

Novel event-processing operators are provided. These novel operators can be advantageously utilized in implementing event processors and event-processing systems. The novel event-processing operators include operators for event filtering by clustering, operators for event partitioning by classification, operators for event abstraction by hypothesis testing, and operators for event filtering by point estimation.

12 Claims, 9 Drawing Sheets

EVENT-PROCESSING OPERATORS

FIELD OF THE INVENTION

The present disclosure relates generally to event processing systems. For example, embodiments of inventive matter disclosed herein provide operators useful in implementing event processors.

BACKGROUND OF THE INVENTION

Many business enterprises use computer systems to monitor and process business activities and transactions. Business entities that handle complex transactions and activities, in particular, often employ distributed computer systems.

Conventional database systems and business data processing algorithms emphasize a passive repository storing a large collection of data elements and perform human initiated queries and transactions on such repository. Such conventional technology emphasizes the importance of the current state of the data. Hence, current values of the data elements can be easy to obtain, while previous values can only be found by decoding database log files. Such conventional technology also treats notifications and triggers with low priority, and these constructs are added mostly as an after thought to the current systems. Conventional technology also assumes that data elements are synchronized and that queries have exact answers. In many stream-oriented applications, data arrives asynchronously and answers must be computed with incomplete information.

There is a substantial class of applications where data takes the form of continuous data streams rather than finite stored data sets, and where clients require long-running continuous queries rather than one-time queries. This class of applications include network monitoring, telecommunication data management, sensor networks, manufacturing, and others. The traditional database systems and business data processing algorithms are not well equipped to support these kinds of applications. Business enterprises implement event processing systems including event processors to support these kinds of applications.

SUMMARY OF THE INVENTION

Generally, an event processor collects streams of events, processes the events, and generates output related to the processing of the events. The generated output can include, for example, notifications to interested parties or a stream of events, for example. An event is typically defined as "a change in state." For example, when a consumer purchases an automobile, the automobile's state changes from "for sale" to "sold." A system architecture for an automobile dealership may treat this state change as an event to be detected, produced, published, and consumed by various applications within the architecture.

Event processors are frequently implemented as a network of operators and are designed to operate in real time. Designers of event processors have designed and implemented event processors in a variety of different programming languages. For example, event processors can be implemented as a network of CQL operators. CQL is a Continuous Query Language for registering continuous queries against streams and updateable relations.

Inventive matter discussed herein deviates with respect to and improves upon technology known in the prior art. Embodiments disclosed herein provide for novel event processing operators that can be advantageously utilized in implementing event processors and event processing systems. Event processing operators disclosed herein may be implemented in software only, hardware only, or a combination of hardware and software.

In a first particular embodiment, an operator for event filtering by clustering is provided. The operator receives a stream of events. For each event in the received stream of events, the operator determines whether the event is associated with one of a plurality of event clusters. For each event determined to not be associated with any of the plurality of event clusters, the operator places an alert event into an output stream. The operator periodically redefines the plurality of event clusters based on a subset of the events in the received stream. In this manner, the operator can compute clusters from historical data (i.e., events previously received) and then filter out events that fall outside of all the computed clusters.

In a second particular embodiment, an operator for partitioning events by classification is provided. This operator classifies received events in accordance with a generalized linear model comprising a predetermined distribution function, a linear predictor, and a predetermined link function. The operator periodically receives classified events from a stream of model input and, based on these already classified events, estimates unknown parameters in the linear predictor. For each event in a received stream of unclassified events, the operator determines, based on the generalized linear model, whether the event has a probability equal to or greater than a predetermined threshold of being associated with one of a plurality of classifications. For each event determined to have a probability equal to or greater than the predetermined threshold of being associated with one of the plurality of classifications, the operator places the event in an output stream along with a mark indicating the classification to which the event is associated.

In a third particular embodiment, an operator for event abstraction by hypothesis testing is provided. This operator periodically identifies a subset of events in a received stream of events. The operator determines whether the subset of events fails a hypothesis about a statistical distribution of events in the received stream. Whenever, the operator determines that the subset of events fails the hypothesis, the operator places an alert event into an output stream.

In a fourth particular embodiment, an operator for event filtering by point estimation is provided. This operator receives a stream of events. For each event in the received stream of events, the operator evaluates a predicate comprising predetermined parameters. For each event for which the predicate evaluates to true, the operator places an alert event into an output stream. Periodically, the operator estimates values for the predetermined parameters based on a subset of the events in the received stream.

In accordance with embodiments disclosed herein, an implementer of an event processing system can include, in the event processing system, event processors that include one or more of the operators described herein. In this manner, systems described herein can execute event processors defined as a network of operators including one or more of the operators described herein. It is to be understood that the inventive matter disclosed herein may be embodied strictly as a software program, as software and hardware, or as hardware alone. The features disclosed herein may be employed in workstations and other computerized devices and software systems for such devices such as those manufactured by SUN Microsystems, Inc., of Santa Clara, Calif. For example, inventive matter disclosed herein can be advantageously utilized in developing JBI components such as an Intelligent Event Processor ("IEP").

BRIEF DESCRIPTION OF THE DRAWINGS

Objects, features, and advantages of inventive matter disclosed herein may be better understood by referring to the following description of example embodiments in conjunction with the accompanying drawings, in which like reference characters indicate like structural elements and features in the various figures. The drawings are not meant to limit the scope of the invention. For clarity, not every element may be labeled in every figure. The drawings are not necessarily to scale, emphasis instead being placed upon illustrating embodiments, principles, and concepts.

DESCRIPTION OF EXAMPLE EMBODIMENTS

Figure 1:
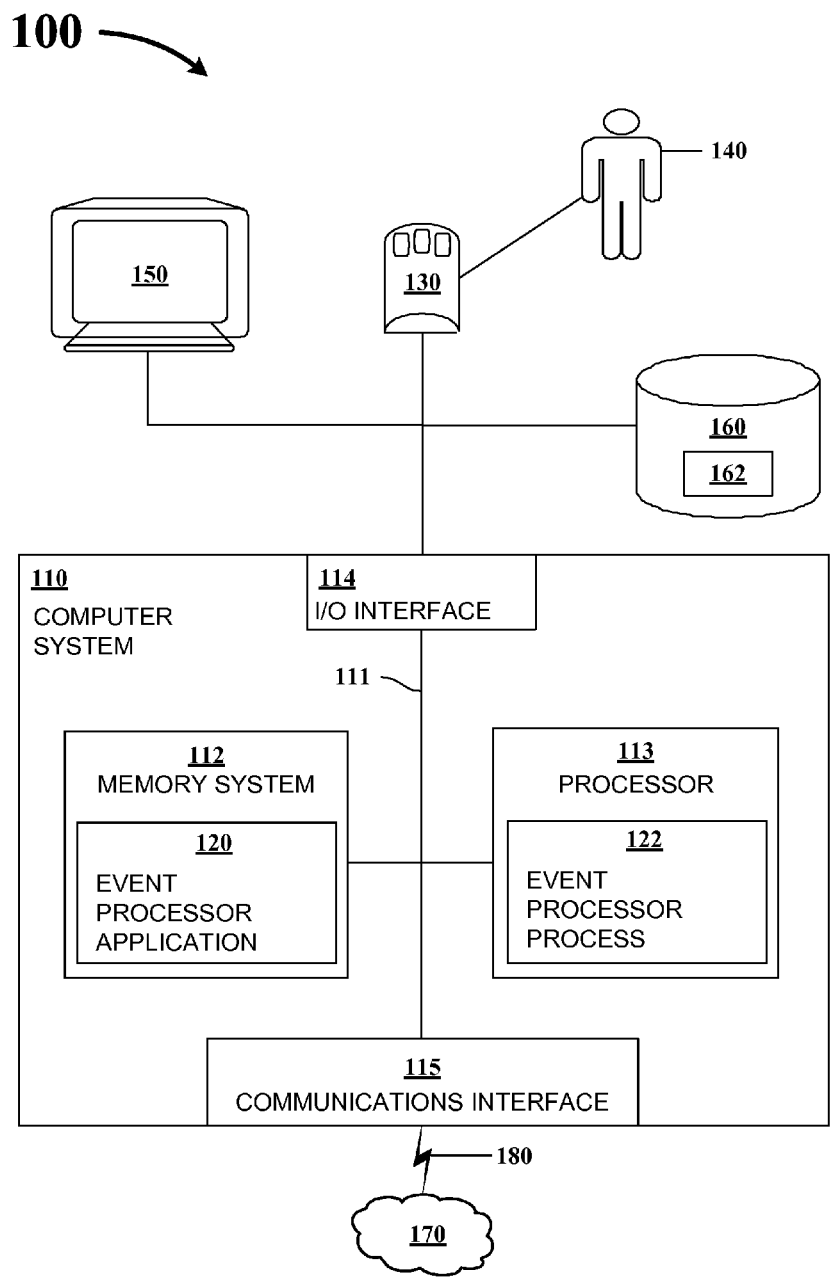
FIG. 1 is a block diagram of a computer environment illustrating an example architecture of a respective computer system useful for implementing an event processor according to embodiments disclosed herein.

FIG. 1 is a block diagram of a computing environment 100 illustrating an example architecture of a respective computer system 110 useful for implementing an Event-Processor application 120 according to embodiments disclosed herein. Computer system 110 can be a computerized device such as a personal computer, workstation, portable computing device, console, network terminal, processing device, etc. As shown, computer system 110 of the present example includes an interconnect 111, such as a data bus or other circuitry, that couples a memory system 112, a processor 113, I/O interface 114, and a communications interface 115. An input device 130 (e.g., one or more user/developer-controlled devices such as a keyboard, mouse, touchpad, trackball, etc.) couples to the processor 113 through the I/O interface 114 and enables a user 140, such as a developer of an event processor or an administrator of an event processor, to provide input commands and generally interact with a graphical user interface that the Event-Processor application 120 and the Event-Processor process 122 provide on a display 150. I/O interface 114 potentially provides connectivity to peripheral devices such as the input device 130, display screen 150, storage device 160, etc. The computer environment 100 includes a storage device 160 that can be used for storing one or more files 162. The files 162 may contain, for example, programming constructs such as those constructs embodying previously designed operators or previously designed event processors. Additionally, the files 162 may contain, for example, data such as event streams comprising input to or output from executing event processors.

Communications interface 115 enables computer system 110 to communicate with network 170 over the communication link 180 to retrieve and transmit information from remotely located sources if necessary. For example, the computer system 110 may be communicatively connected via the communication link 180 to other computer systems on the network 170 that can also execute Event-Processor applications. In this manner, Event-Processors performing operators, such as those described herein, can communicate with each other. For example, the Event-Processor process 122 may produce an output stream that is sent via the communication link 180 and becomes an input stream to a second Event-Processor process executing on the network 170. Similarly, an output stream of an Event-Processor process executing on the network may be sent via the communications link 180 to the Event-Processor process 122 and become an input stream to the Event-Processor process 122.

As shown, memory system 112 can be any type of computer-readable medium and in this example is encoded with Event-Processor application 120 that supports functionality as herein described, such as operators described herein. Event-Processor application 120 can be embodied as computer software code such as data and/or logic instructions (e.g., code stored in the memory or on another computer-readable medium such as a disk) that supports processing functionality according to different embodiments described herein. During operation of the computer system 110, processor 113 accesses the memory system 112 via the interconnect 111 in order to launch, run, execute, interpret, or otherwise perform the logic instructions of the Event-Processor application 120. Execution of the Event-Processor application 120 produces processing functionality in an Event-Processor process 122. In other words, the Event-Processor process 122 represents one or more portions of the Event-Processor application 120 performing within or upon the processor 113 in the computer system 110. Those skilled in the art will understand that the computer system 110 can include other processes and/or software and hardware components, such as an operating system that controls allocation and use of hardware resources.

It should be noted that, in addition to the Event-Processor process 122 that carries out method operations as discussed herein, other embodiments herein include the Event-Processor application 120 itself (i.e., the un-executed or non-performing logic instructions and/or data). The Event-Processor application 120 may be stored on a computer-readable medium such as a floppy disk, hard disk, or in an optical medium. According to other embodiments, the Event-Processor application 120 can also be stored in a memory type system such as in firmware, read-only memory (ROM), or, as in this example, as executable code within the memory system 112 (e.g., within Random Access Memory or RAM). Thus, it should be understood that embodiments disclosed herein include logic encoded in one or more tangible media for execution and, when executed, operable to perform methods and processes disclosed herein. Such logic may be embodied strictly as computer software (e.g., a set of computer programming instructions), as computer software and hardware, or as hardware alone.

Functionality supported by computer system 110 and, more particularly, functionality associated with Event-Processor application 120 and Event-Processor process 122 is herein discussed in relation to FIGS. 2-9. For purposes of the following discussion, computer system 110 (e.g., Event-Processor application 120 and/or Event-Processor process 122) generally performs methods and procedures shown in FIGS. 2-9. However, other systems can be configured to provide similar functionality.

Event Filtering by Clustering

Figure 2:
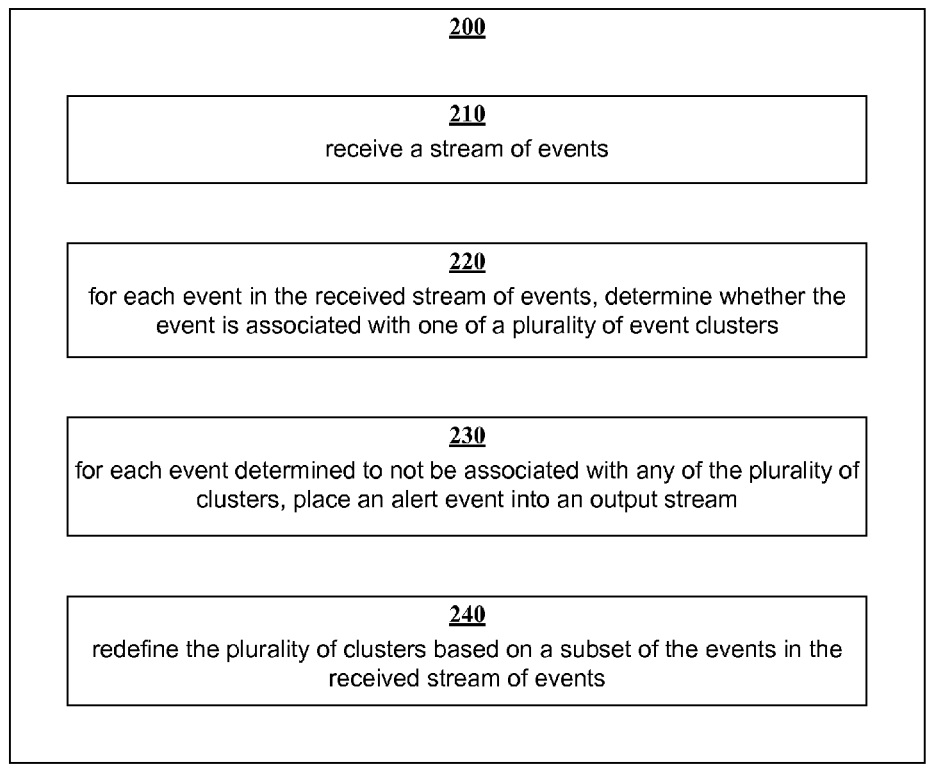
FIG. 2 illustrates procedures performable by an event processor to implement an operator for event filtering by clustering in accordance with embodiments disclosed herein.

FIG. 2 illustrates procedures 200 performable by an event processor, such as implemented by the Event-Processor application 120, in accordance with embodiments disclosed herein. The procedures 200 implement an operator for event filtering by clustering. The procedures 200 comprise Step 210, Step 220, Step 230, and Step 240, which the event processor is not required to execute sequentially. For example, the event processor may execute Step 210 continuously throughout the execution of the procedures 200 and execute Step 220 each time an event is received in the stream of events. In Step 210, the event processor receives a stream of events. Thus, the stream of events is an input stream to the operator for event filtering by clustering.

In Step 220, the event processor determines whether an event is associated with one of a plurality of event clusters. The event processor performs this determination for each event in the received stream of events. The event processor can employ techniques known in the art of clustering for determining whether an event is associated with one of a plurality of clusters. Typically, the event processor determines whether an event is within the radius of one of the clusters according to a predetermined distance function for determining the distance between an event and the centroid of a cluster. That is, if the distance between the event and the centroid of a cluster, as determined by the predetermined distance function, is less than or equal to the radius of the cluster, then the event is determine to be associated with that cluster. However, if the distance between the event and the centroid of a cluster is greater than the radius of the cluster, then the event is determined to not be associated with that cluster. In particular embodiments, a user may choose the distance function to be employed by this operator for event filtering by clustering. In this manner, a user may create an event processor that implements both a first operator for event filtering by clustering that employs a first distance function and a second operator for event filtering by clustering that employs a second distance function.

In Step 230, the event processor places an alert event into an output stream for each event determined to not be associated with any of the plurality of clusters. Thus, the event processor compares an event with each cluster to determine whether the event is associated with any cluster. If the event processor determines that the event is not associated with any cluster, then the event processor places an alert event in an output stream.

An alert event as used in embodiments described herein may be, for example, an actual event that caused an event processor to put the alert event in an output stream. For example, in performing an operator for event filtering by clustering as described above, the event processor may place in an output stream an event that the event processor has determined is not associated with any cluster. Alternately, the event processor may place an alert event in an output that causes a notification or alert to be send to an administrator of the event processor or a user of the event processor. A user of an event processor may be a person or the user may be another event processor. That is, the output stream of one event processor containing alert events may be an input stream to a second event processor that processes alert events.

In Step 240, the event processor redefines the plurality of clusters based on a subset of the events in the received stream of events. The event processor performs Step 240 periodically. By periodically it is meant herein that the event processor will process a specific number of events from the input stream before performing Step 240. Once Step 240 is performed, the event processor will not perform Step 240 until another specific number of events has been processed. Since the event processor performs Step 220 for each event in the received stream of events, the event processor performs Step 220 the same specific number of times (i.e., once for each event received) before redefining the plurality of clusters in Step 240. This specific number is referred to herein as a sample interval. In particular embodiments, an implementer of an operator for event filtering by clustering may specify the sample interval.

The event processor may employ clustering algorithms known in the art to perform the redefining of clusters in Step 240. For example, the event processor may employ a K-means algorithm to redefine the plurality of clusters. The K-means algorithm is one of the simplest unsupervised learning algorithms that solve the clustering problem. In general, the K-means algorithm comprises the following steps:

1. Place K points into the space represented by the objects (e.g., events) that are being clustered. These points represent initial cluster centroids.
2. Assign each object to the cluster that has the closest centroid.
3. When all objects have been assigned, recalculate the positions of the K centroids.
4. Repeat Steps 2 and 3 until the centroids no longer move. This produces a separation of the objects into clusters.

In Step 240, the cluster redefining is based on a subset of the events in the received stream. The number of events in the subset is referred to herein as the sample size. Similar to the sample interval, in particular embodiments, an implementer of an operator for event filtering by clustering may specify the sample size. In particular embodiments, the subset of events comprises the most recently received events. For example, if a user has specified a sample interval of 500 and a sample size of 250, then each time 500 events have been received the event processor can redefine the clusters using the 250 most recently received events.

By way of a simple example embodiment, assume a user has implemented an operator for event filtering by clustering to have an input stream of events and an output stream of events, wherein each event in the input stream has two attributes X and Y. Also assume that the user has chosen a sample interval of 10 and a sample size of 4. Finally, assume that the user has chosen a distance function d that is the square root of $((d1 \times d1)+(d2 \times d2))$, wherein d1 is a function for determining the distance between the X attribute of a first event or centroid and the X attribute of a second event or centroid. That is, if A is a first event or centroid and B is a second event or centroid, then $d1(A, B)=|X_A-X_B|$, where $X_A$ is the X attribute of A and $X_B$ is the X attribute of B. Similarly, $d2(A, B)=|Y_A-Y_B|$, where $Y_A$ is the Y attribute of A and $Y_B$ is the Y attribute of B. Thus, in this example, the distance between A and B is the square root of $((d1(A, B) \times d1(A, B))+(d2(A, B) \times d2(A, B)))$.

Since the sample interval is 10, after the event processor processes the $10^{th}$ event in the input stream, the event processor redefines the plurality of event clusters based on a subset of the events in the received stream of events. The event processor will also redefine the plurality of event clusters after processing the $20^{th}$ event, the $30^{th}$ event, the $40^{th}$ event, etc. Table 1 shows the subset of the events in the input stream to be used in redefining the plurality of event clusters after the event processor processes the $10^{th}$ event. The $7^{th}$ event is designated as A, the $8^{th}$ event as B, the $9^{th}$ event as C, and the $10^{th}$ event as D.

TABLE 1

| Event ID | Event Attributes |
|---|---|
| A | (5, 3) |
| B | (−1, 1) |
| C | (1, −2) |
| D | (−3, −2) |

The event processor initializes the clusters. The event processor may initialize the clusters using techniques known in the art. In this example, the event processor creates two initial clusters: (AB) and (CD). That is, A and B are both assigned to the cluster (AB) and both C and D are assigned to the cluster (CD). The centroid of (AB) has an X attribute of $X=(5−1)/2=2$ and a Y attribute of $Y=(3+1)/2=2$. Thus, the centroid of (AB) has coordinates (2, 2). Similarly, the centroid of (CD) has coordinates (−1, −2). The distance between A and (AB), (i.e., d(A, (AB))) is the square root of $((d1 \times d1)+(d2 \times d2))= ((5−2)^2+(3−2)^2)^{1/2}=10^{1/2}=3.16$. Similarly, d(A, (CD))=7.8. Since A is closer to (AB) than it is to (CD), the event processor does not reassign A to a different cluster. However, d(B, (AB))=3.16 and d(B, (CD))=3. Therefore, B is closer to (CD) than to (AB), so the event processor reassigns B to the (CD) cluster and this new cluster becomes (BCD).

The step of checking each event to determine whether the event is closer to a cluster different than the cluster with which it is currently associated and reassigning the event to a new cluster if necessary, continues until all events are closest to the cluster to which they are currently assigned. For example, the centroid of the new cluster (A) is (5, 3) and the centroid of the new cluster (BCD) is (−1, −1). Therefore, the new distance evaluations are as follows:

d(A, (A))=0
d(A, (BCD))=7.2
d(B, (A))=6.3
d(B, (BCD))=2
d(C, (A))=6.4
d(C, (BCD))=2.3
d(D, (A))=9.4
d(D, (BCD))=2.3

Since each event is closest to the cluster to which the event is currently assigned, the event processor does not reassign any of the events and the step of redefining the clusters is finished. The new cluster (A) is centered at (5, 3) with radius mean of 0 and radius standard deviation of 0. The new cluster (BCD) is centered at (−1, 1) with radius mean ("r-mean") of 2.2 and radius standard deviation ("r-std") of 0.17. It should be noted here that this example has been simplified in that each event in the subset is assigned to a cluster after the redefining of the clusters is performed. However, other algorithms may allow for one or more events in the subset of events to be an outlier and not be assigned to any particular cluster.

Now the event processor receives the $11^{th}$ event and it has coordinates of (10, 6). The event processor compares this event with each cluster to determine whether the cluster is associated with any of the clusters. The method of determining whether an event is associated with a cluster is generally predetermined. For example, a user, when creating the operator, can specific a function to apply to determine whether an event is associated with a cluster. In this example, an event is associated with a cluster if the distance from the event to the centroid of the cluster is within $((3 \times \text{r-std})+\text{r-mean})$. In this example, the $11^{th}$ event is too distant from each of the two clusters to be associated with either cluster so the event processor places an alert event indicating this result into an output stream.

Figure 3:
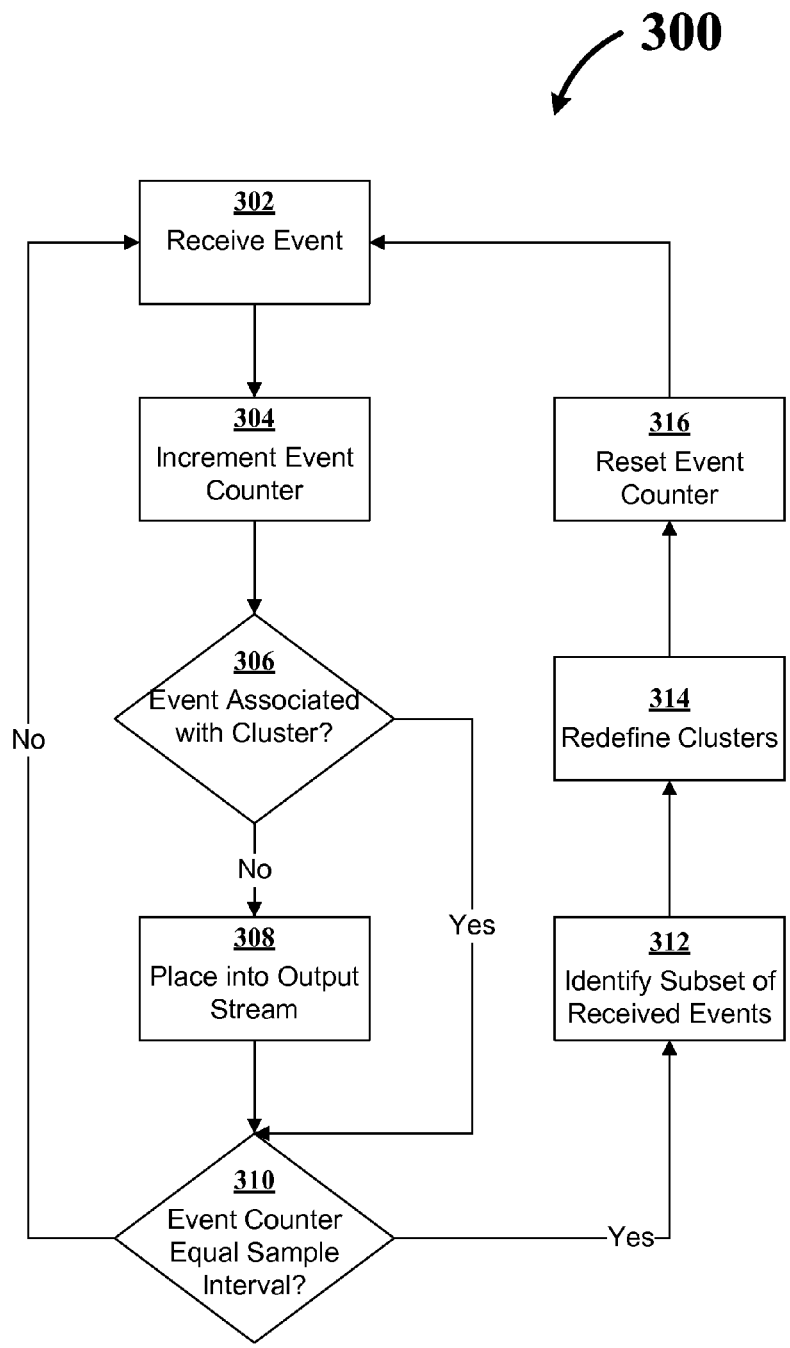
FIG. 3 illustrates a flowchart of a particular embodiment of the operator for event filtering by clustering implemented by the procedures of FIG. 2.

FIG. 3 illustrates a flowchart 300 of a particular embodiment of the operator implemented by the procedures 200 of FIG. 2. In Step 302 an event processor embodying the operator receives an event. In Step 304, the event processor increments an event counter that keeps track of how many events have been received since the last time the event counter was reset. In Step 306, the event processor determines whether the received event is associated with any one of a plurality of clusters. If the received event is not associated with any cluster, then the event processor proceeds to Step 308. In Step 308, the event processor places the received event (or other alert event) into an output stream. Upon completion of Step 308, the event processor proceeds to Step 310. If the event processor determines, in Step 306, that the received event is associated with a cluster, then the event processor proceeds directly to Step 310.

In Step 310, the event processor determines whether the event counter is equal to the sample interval. If the event counter is not equal to the sample interval, the event processor proceeds to Step 302 and receives another event. If the event counter is equal to the sample interval, the event processor proceeds to Step 312.

In Step 312, the event processor identifies a subset of received events. In particular embodiments, the event processor will identify a sample-size number of the most recently received events as the subset. In Step 314, the event processor redefines the event clusters based on the subset of events identified in Step 312. In Step 316, the event processor resets the event counter. After completing Step 316, the event processor returns to Step 302.

Event Partitioning by Classification

Figure 4:
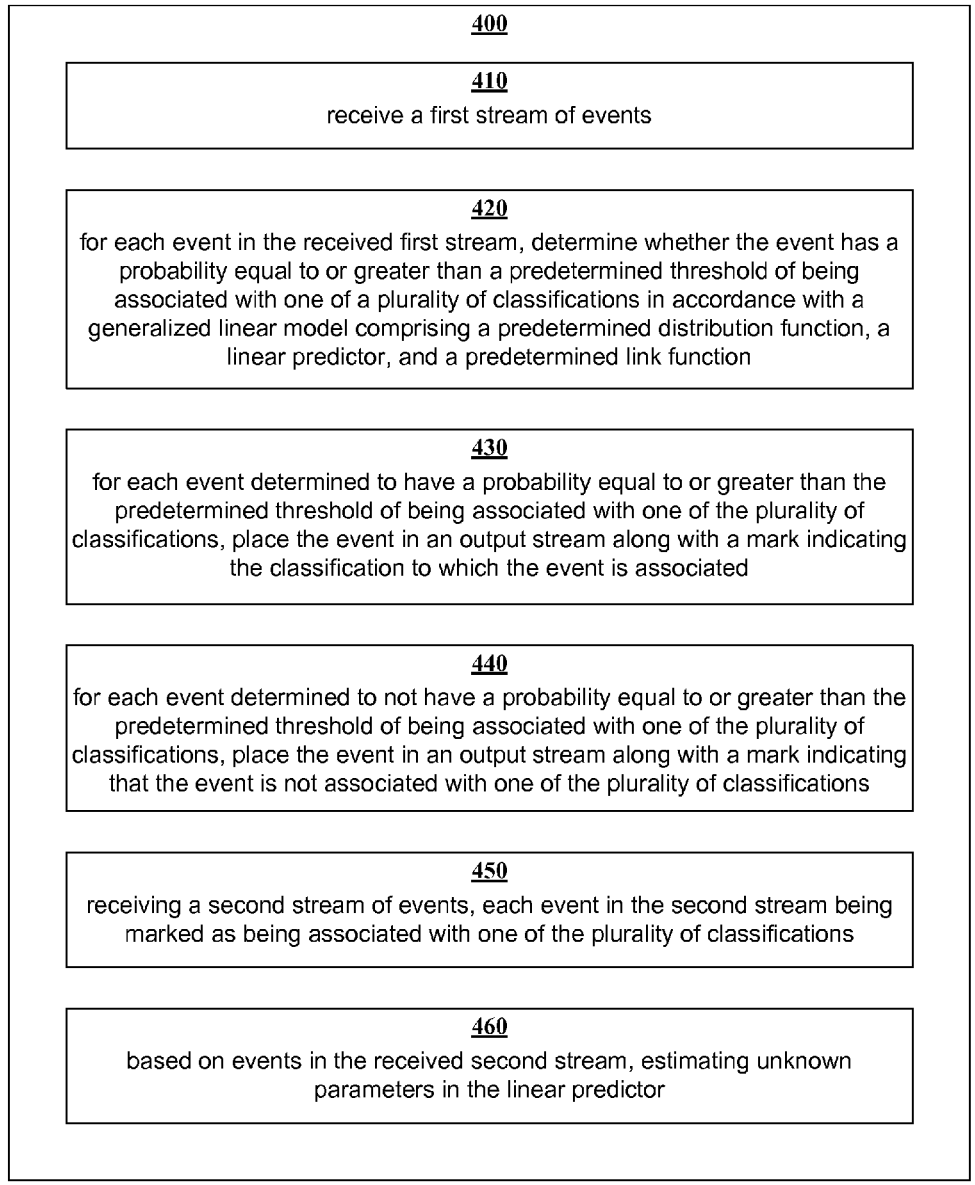
FIG. 4 illustrates procedures performable by an event processor to implement an operator for partitioning events by classification in accordance with embodiments disclosed herein.

FIG. 4 illustrates procedures 400 performable by an event processor, such as implemented by the Event-Processor application 120, in accordance with embodiments disclosed herein. The procedures 400 implement an operator for event partitioning by classification. The procedures 400 comprise Step 410, Step 420, Step 430, Step 440, Step 450, and Step 460, which the event processor is not required to execute sequentially. For example, the event processor may execute Step 410 continuously throughout the execution of the procedures 400 and execute Step 420 each time an event is received in the stream of events. In Step 410, the event processor receives a first stream of events. Thus, this first stream of events is an input stream to the operator for event partitioning by classification.

In Step 420, the event processor determines whether an event has a probability equal to or greater than a predetermined threshold of being associated with one of a plurality of classifications in accordance with a generalized linear model comprising a predetermined distribution function, a linear predictor, and a predetermined link function. The event processor performs this determination for each received event in the first stream of events.

For each event determined, in Step 420, to have a probability equal to or greater than the predetermined threshold of being associated with one of the plurality of classifications, the event processor, in Step 430, places the event in an output stream along with a mark indicating the classification to which the event is associated. For each event determined, in Step 420, to not have a probability equal to or greater than the predetermined threshold of being associated with one of the plurality of classifications, the event processor, in Step 440, places the event into an output stream along with a mark indicating that the event is not associated with one of the plurality of classifications. The term mark as used herein should be broadly interpreted to include any kind of indication of which classification the event is associated with or whether the event could not be classified. For example, if the event could not be classified, the event processor may mark the event as "unassociated" or "unassigned."

By "places the event into an output stream," it is not herein meant that the event processor must necessarily place the exact event or even an identical copy of the event into the output stream. It is sufficient that the event processor include information in the placed event sufficient to identify the processed event that caused the placed event to be placed in the output stream. For example, the event processor may "place the event into an output stream" by placing an alert event into the output stream.

In Step 450, the event processor receives a second stream of events. Each event in this second stream of events is marked as being associated with one of the plurality of classifications.

In Step 460, the event processor estimates unknown parameters in the linear predictor. The event processor performs this estimating based on a sample-size number of events in the second stream of events. The event processor performs Step 460 periodically based on a sample interval. The sample interval can be chosen by a user at the time the event processor is set up to implement an operator for event partitioning by classification.

In statistics, a generalized linear model ("GLM") is a known generalization of ordinary least squares regression. A GLM relates the random distribution of a measured variable of the experiment (i.e., the distribution function) to the systematic (i.e., non-random) portion of the experiment (i.e., the linear predictor) through a function called the link function. In a GLM, each outcome of the dependent variable Y is assumed to be generated from a particular distribution function in the exponential family (i.e., a large range of probability distributions). The mean $\mu$ of the distribution depends on the independent variables X through:

$$E(Y) = \mu = g^{-1}(X\beta)$$

where $X\beta$ is the linear predictor, a linear combination of unknown parameters $\beta$, and g is called the link function. In this framework, the variance is typically a function V of the mean:

$$Var(Y) = V(\mu) = V(g^{-1}(X\beta)).$$

The unknown parameters $\beta$ are typically estimated with maximum likelihood, quasi-maximum likelihood, or Bayesian techniques.

A GLM consists of three elements:
1. A distribution function f, from the exponential family,
2. A linear predictor $\eta = X\beta$,
3. A link function g such that $E(Y) = \mu = g^{-1}(\eta)$.

The linear predictor is the quantity which incorporates the information about the independent variables into the model. The linear predictor is related to the expected value of the data through the link function. $\mu$ is expressed as a linear combinations of unknown parameters $\beta$. The coefficients of the linear combination are represented as the matrix of independent variables X. Thus, $\mu$ can be express as $X\beta$. The elements of X are either measured or stipulated by in the modeling design process. The link function provides the relationship between the linear predictor and the mean of the distribution function.

In designing an event processor for implementing an operator for event partitioning by classification in accordance with embodiments disclosed herein, the designer may choose a list of classifications or categories, a distribution function, a link function, a sample interval, a sample size, and a threshold. Example distribution functions include binary, binomial, multinomial, and Poisson. Alternately, the designer of the event processor may choose a custom designed distribution function. Example link functions include log, logit, probit, comploglog, and logloglink. Alternately, the designer of the event processor may choose a custom designed link function.

The operator implemented by the event processor has two input streams: a data input stream and a model input stream. A sample-size number of events from the model input stream is used to estimate unknown parameters in the linear predictor. This estimation can be performed using maximum likelihood or other estimation techniques, such as quasi-maximum likelihood, or Bayesian techniques. These estimates are then used in classifying events from the data input stream that can be classified with a probability greater than the predetermined threshold. After classifying a sample-interval number of events from the data input, the operator once again uses the next sample-size number of events from the model input to re-estimate the unknown parameters in the linear predictor.

By way of example, let S1 be a stream of vehicle events. An event e in S1 has the form (Weight, TS) where TS is the timestamp when the event is collected. Let S3 be a stream of previously processed (not necessarily by this event processor) vehicle events. An event e in S3 has the form (Gas-performance, Weight, TS) where gas-performance can have a value of either "good" or "poor." We want to define an event partitioning operator F that computes a new stream S2. Here, S2 consists of those events from S1 that are marked either as "good," "poor," or "unassigned." Hence, we have two classifications or categories here: (c1, c2)=("good", "poor"). An example configuration of F is as follows:

data input: S1
model input: S3
output: S2
list of categories: ("good", "poor")
distribution function: binary
link function: logit
thresh hold: 0.7

Assume that the first 500 events in the model input stream S3 are the following:

| Event id | Gas-performance | Weight (pound) |
|----------|----------------|----------------|
| 1 | poor | 4300 |
| 2 | good | 2600 |
| ... | ... | ... |
| 500 | poor | 3600 |

The operator F computes a regression model from this set of data. For this example, we will use Maximum Likelihood Estimation (MLE) to estimate the unknown parameters in the model. Let $Y_i$ be the gas-performance attribute of the i-th event, and $y_i$ be the actual value where $1 \le i \le 500$. We code "poor" as 1 and "good" as 0. Hence, $y_i$ is either 0 or 1. Since gas-performance has a binary distribution, $Y_i$ is distributed as binary($\pi_i$). That is, the probability of $Y_i=1$ is $\pi_i$, and the probability of $Y_i=0$ is $1-\pi_i$. Hence, $$Pr(Y_i = y_i) = \pi_i^{y_i}(1-\pi_i)^{1-y_i} \qquad (1)$$

and $$Pr(Y_1 = y_1, \ldots, Y_{500} = y_{500}) = \prod_{i=1}^{500} Pr(Y_i = y_i)$$
$$= \prod_{i=1}^{500} \pi_i^{y_i}(1-\pi_i)^{1-y_i}.$$

Since the link function is logit, the regression model is:

$$\text{logit}(\pi_i) = \log\left(\frac{\pi_i}{1-\pi_i}\right) = \alpha + \beta x_i.$$

where $x_i$ is the actual value of i-th event's Weight attribute, and $1 \le i \le 500$. Hence $$\pi_i = \frac{e^{\alpha+\beta x_i}}{1+e^{\alpha-\beta x_i}}. \qquad (2)$$

Plugging equation (2) into equation (1), gives:

$$Pr(Y_1 = y_1, \ldots, Y_{500} = y_{500}) = \qquad (3)$$
$$\prod_{i=1}^{500}\left(\frac{e^{\alpha-\beta x_i}}{1+e^{\alpha+\beta x_i}}\right)^{y_i}\left(1-\frac{e^{\alpha-\beta x_i}}{1+e^{\alpha+\beta x_i}}\right)^{1-y_i}.$$

Note that $x_i$ and $y_i$ ($1 \le i \le 500$) are known values in the model input stream S3, and $\alpha$ and $\beta$ are unknown values.

In this example, we use MLE to estimate unknown parameters $\alpha$ and $\beta$ by finding the values of $\alpha$ and $\beta$ that maximize (3). We can apply any of the nonlinear optimization algorithms to find the optimizing values of $\alpha$ and $\beta$. For this example, we apply a Nonlinear Conjugate-Gradient algorithm, and find: $\alpha = -13.38$ and $\beta = 0.0042$. Hence we have finished computing the model as $$\log\left(\frac{p}{1-p}\right) = -13.38 + 0.0042 * \text{Weight},$$

where p is the probability of a vehicle being evaluated as a poor gas-performer.

Assume that there is a vehicle event in the data input stream that has weight=4100, then $$\log\left(\frac{p}{1-p}\right) = -13.38 + 0.0042 * 4100 = 3.8.$$

Hence, $$p = \frac{e^{3.8}}{1+e^{3.8}} = 0.9781.$$

That is, the chance that this vehicle is a poor gas-performer is 0.9781. Since 0.9781>0.7 (i.e., the threshold), this vehicle is marked as "poor," and an event (4100, "poor") is generated and put into the output stream S2.

Assume that there is a vehicle event in the data input stream that has weight=2700, then $$\log\left(\frac{p}{1-p}\right) = -13.38 + 0.0042 * 2700 = -2.04.$$

Hence, $$p = \frac{e^{-2.04}}{1+e^{-2.04}} = 0.1151.$$

That is, the chance that this vehicle is a poor gas-performer is 0.1151. Hence, the vehicle's chance of being a good gas-performer is 1−0.1151=0.8849. Since 0.8849>0.7, this vehicle is marked as "good," and an event (2700, "good") is generated and put into the output stream S2.

Assume that there is a vehicle event in the input stream that has weight=3200, then $$\log\left(\frac{p}{1-p}\right) = -13.38 + 0.0042 * 3200 = 0.06.$$

Hence, $$p = \frac{e^{0.06}}{1+e^{0.06}} = 0.515$$

That is, the chance that this vehicle is a poor gas-performer is 0.515. Hence, the vehicle's chance of being a good gas-performer is 1−0.515=0.485. Since both chances are less than 0.7, this vehicle is marked as "unassigned," and an event (3200, "unassigned") is generated and put into the output stream S2.

Figure 5:
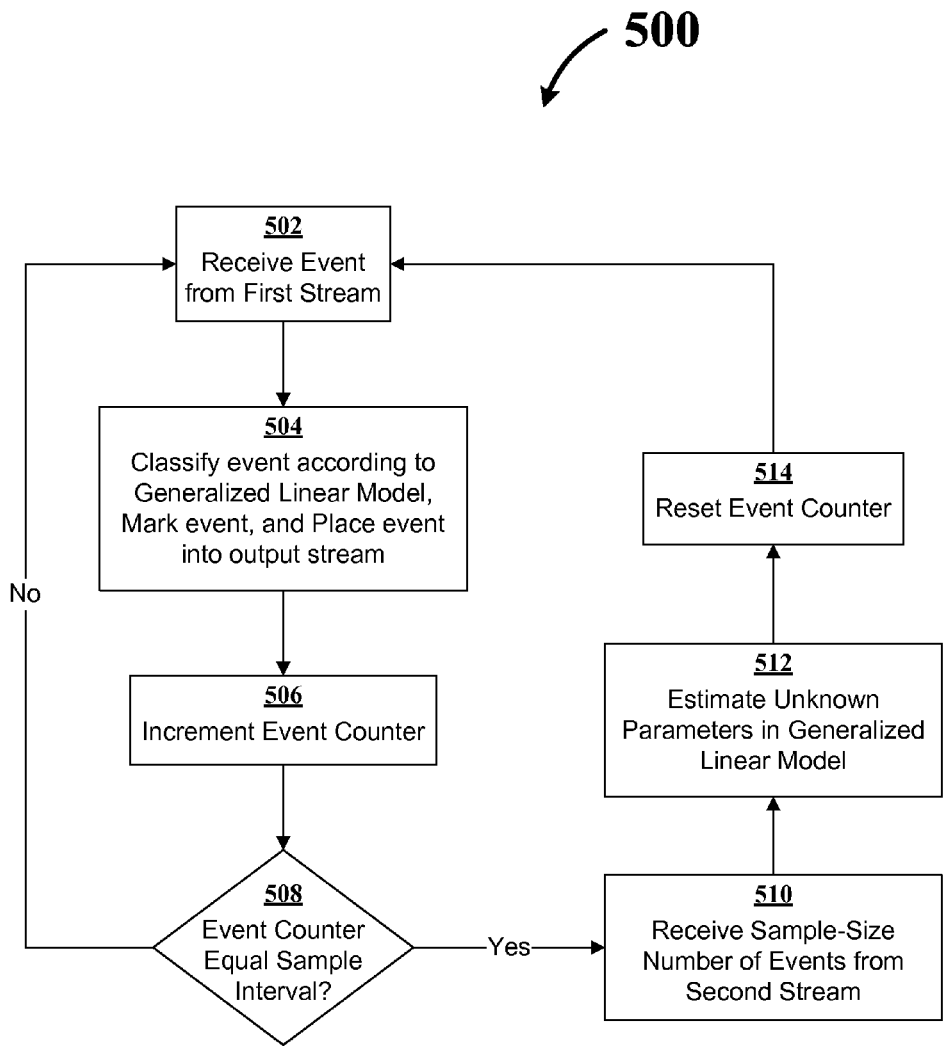
FIG. 5 illustrates a flowchart of a particular embodiment of the operator for partitioning events by classification implemented by the procedures of FIG. 4.

FIG. 5 illustrates a flowchart 500 of a particular embodiment of the operator implemented by the procedures 400 of FIG. 4. In Step 502, an event processor embodying the operator receives an event from a first stream (i.e., the data input stream). In Step 504, the event processor classifies the event according to a GLM, marks the event accordingly, and places the marked event (e.g., an alert event) into the output stream. In Step 506, the event processor increments an event counter that keeps track of how many events have been received since the last time the event counter was reset.

In Step 508, the event processor determines whether the event counter is equal to the sample interval. If the event counter is not equal to the sample interval, the event processor proceeds to Step 502 and receives another event. If the event counter is equal to the sample interval, the event processor proceeds to Step 510.

In Step 510, the event processor receives a sample-size number of events from a second steam (i.e., the model input stream). In Step 512, the event processor uses these events from the second stream to estimate unknown parameters in the GLM. In Step 514, the event processor resets the event counter. After completing Step 514, the event processor returns to Step 502.

Event Abstraction by Hypothesis Testing

Figure 6:
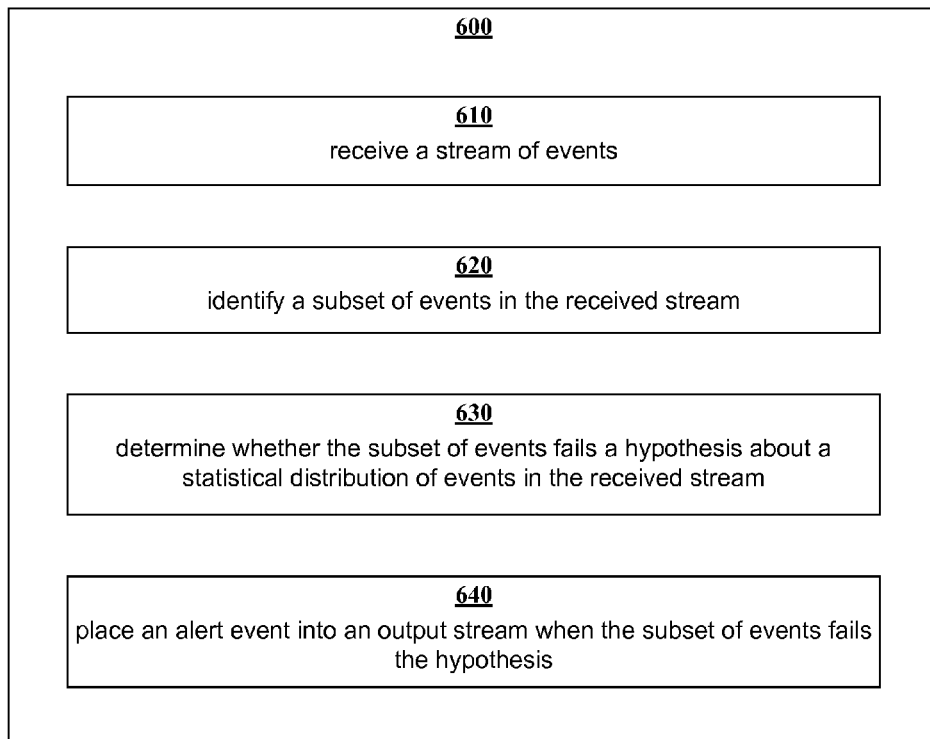
FIG. 6 illustrates procedures performable by an event processor to implement an operator for event abstraction by hypothesis testing in accordance with embodiments disclosed herein.

FIG. 6 illustrates procedures 600 performable by an event processor, such as implemented by the Event-Processor application 120, in accordance with embodiments disclosed herein. The procedures 600 implement an operator for event abstraction by hypothesis testing. Generally, this operator takes a sample of events from an input stream, tests the sample of events against a statistical hypothesis, and generates a higher-level event if the sample fails the hypothesis. In designing an event processor for implementing an operator for event abstraction by hypothesis testing in accordance with embodiments disclosed herein, the designer may choose an input stream, an output stream, a statistical distribution D of events in the input stream, a hypothesis about the parameters in D, a sample interval, and a sample size. Once this operator is deployed, the operator takes samples of events according to the sample interval and sample size and tests the hypothesis about the statistical distribution D with each sample. The operator places a new event into the output stream if a sample of events fails (rejects) the hypothesis D.

The procedures 600 comprise Step 610, Step 620, Step 630, and Step 640, which the event processor is not required to execute sequentially. For example, the event processor may execute Step 610 continuously throughout the execution of the procedures 600. In Step 610, the event processor receives a stream of events. Thus, the stream of events is an input stream to the operator for event abstraction by hypothesis testing.

In Step 620, the event processor identifies a subset of events (i.e., the sample) in the received stream. The number of identified events in the subset of events is equal to the sample size. Typically, the sample will consist of the most recently received events. However, the operator does not require the sample to consist of only the most recently received events. For example, if the sample size has been chosen to be 500, then the event processor will typically identify the 500 most recently received events as the sample. The sample size is not required to be smaller than the sample interval. For example, if the sample interval is 200 and the sample size is 500, the event processor may test the most recent 500 events after every group of 200 events is received. Thus, the event processor will test a sample consisting of the $301^{st}$ event through the $800^{th}$ event after the $800^{th}$ event is received. The event processor will perform the next test after the $1000^{th}$ event is received and the events in the sample will be the $501^{st}$ event through the $1000^{th}$ event.

In Step 630, the event processor determines whether the subset of events fails a hypothesis about a statistical distribution of events in the received stream. In Step 640, the event processor places an alert event into an output stream when the subset of events fails the hypothesis.

By way of example, let S1 be a stream of measurements of products produced by an assembly line. Assume that measurements of products has a Normal distribution. The product specification requires the target measurement be 2 inches, and 99% of measurements must be in the range of (1.99, 2.01). Hence we set the hypothesis that the measurements of products have distribution N(2, 0.0033). That is the statistical distribution D is a Normal distribution having a mean $\mu$ of 2 and a standard deviation $\sigma$ of 0.0033. The standard deviation $\sigma$ is (2.01−1.99)/6=0.0033 because the range centered at the mean with a size of six standard deviation holds 99% of data of a Normal distribution. Let S2 be a stream of alerts. Thus, the configuration of this example operator F is as following:
 a. input stream: S1
 b. output stream: S2
 c. D=N($\mu$, $\sigma$)
 d. hypothesis: $\mu$=2 and $\sigma$=0.0033
 e. sample interval: 200
 f. sample size: 500
F will take samples of size 500 for every 200 events (i.e., measurements), and test the sample against the hypothesis: $\mu$=2 and $\sigma$=0.0033. If the test fails, F will generate an alert event and place the alert event into stream S2.

Figure 7:
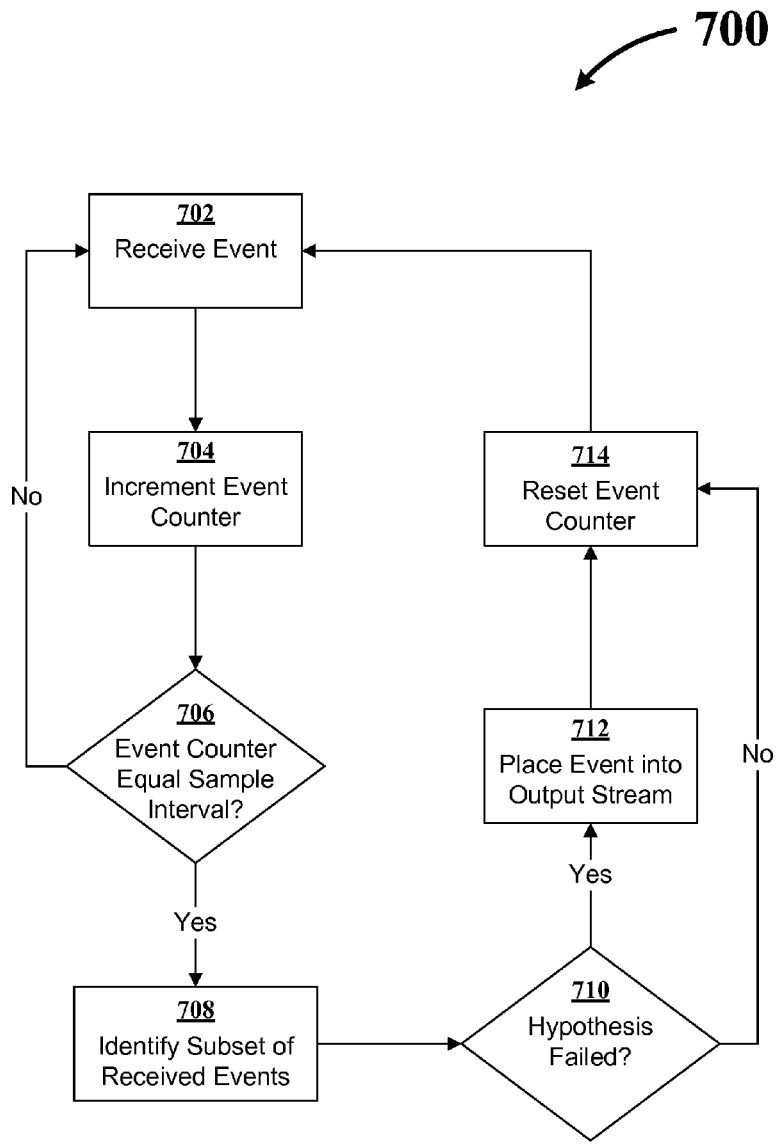
FIG. 7 illustrates a flowchart of a particular embodiment of the operator for event abstraction by hypothesis testing implemented by the procedures of FIG. 6.

FIG. 7 illustrates a flowchart 700 of a particular embodiment of the operator implemented by the procedures 600 of FIG. 6. In Step 702, an event processor embodying the operator receives an event from a first stream (i.e., the data input stream). In Step 704, the event processor increments an event counter. In Step 706, the event processor determines whether the event counter is equal to the sample interval. If the event counter is not equal to the sample interval, the event processor proceeds to Step 702 and receives another event. If the event counter is equal to the sample interval, the event processor proceeds to Step 708.

In Step 708, the event processor identifies a subset of received events to be used as the sample. Upon completion of Step 708, the event processor proceeds to Step 710.

In Step 710, the event processor tests the identified sample against the hypothesis. If the sample does not fail the hypothesis, the event processor proceeds to Step 714. If the sample does fail the hypothesis, the event processor proceeds to Step 712. In Step 712, the event processor places an alert event into an output stream. For example, the event processor may include in the alert event information indicating how or why the sample failed the hypothesis. The alert event may also provide for notifying an administrator of the event processor that the current sample failed the hypothesis. Upon completion of Step 712, the event processor proceeds to Step 714. In Step 714, the event processor resets the event counter. Upon completion of Step 714, the event processor proceeds to Step 702.

Event Filtering by Point Estimation

Figure 8:
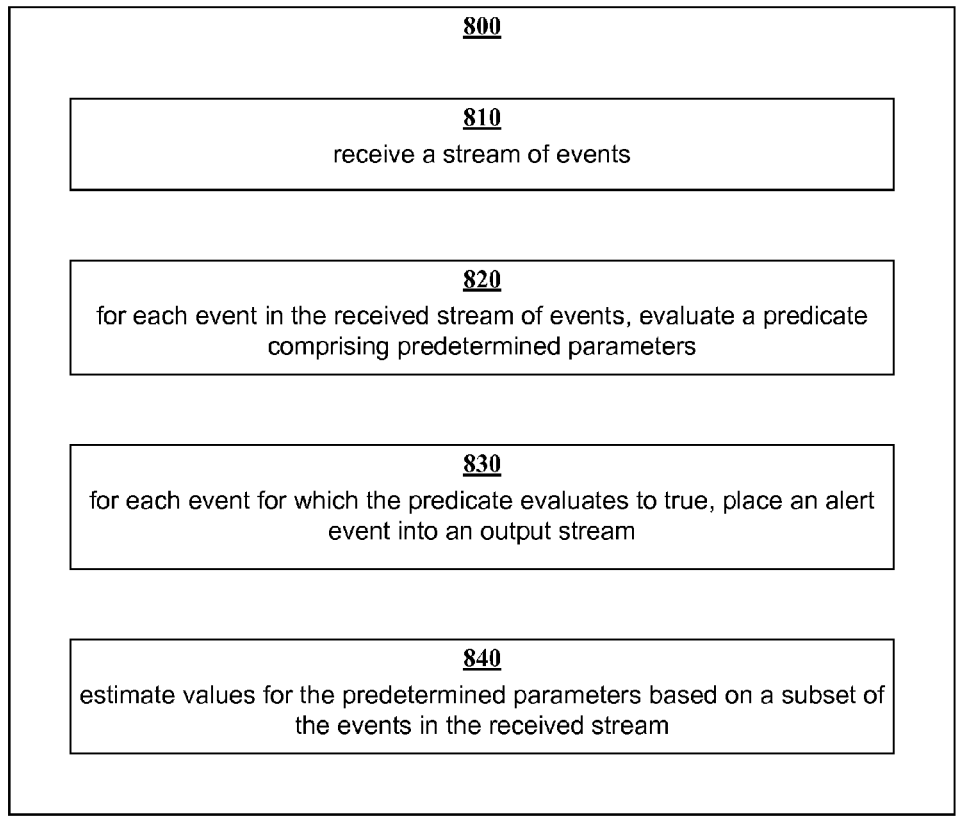
FIG. 8 illustrates procedures performable by an event processor to implement an operator for event filtering by point estimation in accordance with embodiments disclosed herein.

FIG. 8 illustrates procedures 800 performable by an event processor, such as implemented by the Event-Processor application 120, in accordance with embodiments disclosed herein. The procedures 800 implement an operator for event filtering by point estimation. A conventional stream filter is an operator that receives a stream of events, finds those events considered as exceptional by evaluating some predicate, and puts those events into another stream of events if the predicate evaluates to true. The operator for event filtering by point estimation as disclosed herein differs from conventional technology. Generally, the operator as disclosed herein allows a user to specify a predicate using information that is unavailable when the filter is defined. This information must be estimated at runtime using statistical methods. In particular embodiments, a user may specify the following:
 a. a stream as its input,
 b. a stream as its output,
 c. a statistical model of events in the input stream,
 d. predicate with unknown parameter values,
 e. sample interval,
 f. sample size.
Once this operator is deployed, the operator takes samples of events according to the sample interval and the sample size specified to compute estimates of the unknown parameters in the statistical model. The operator takes each event in its input stream, evaluates the predicate with estimated parameter values, and places an alert event into the output stream if the predicate evaluates to true.

The procedures 800 comprise Step 810, Step 820, Step 830, and Step 840, which the event processor is not required to execute sequentially. For example, the event processor may execute Step 810 continuously throughout the execution of the procedures 800 and execute Step 820 each time an event is received in the stream of events. In Step 810, the event processor receives a stream of events. Thus, the stream of events is an input stream to the operator for event filtering by point estimation.

In Step 820, the event processor evaluates a predicate comprising predetermined parameters. The event processor performs this evaluation for each event in the received stream of events. In Step 830, the event processor places an alert event into an output stream for each event for which the predicate evaluates to true.

In Step 840, the event processor estimates values for the predetermined parameters based on a subset of the events in the received stream. The event processor performs Step 840 periodically based on a sample interval. The sample interval can be chosen by a user at the time the event processor is set up to implement an operator for event filtering by point estimation.

By way of example, let S1 be a stream of human body measurements. An event e in S1 has the form (weight, height, ts), where ts is a timestamp for when the measurements for weight and height were taken. Thus, we can define an event filter F that computes a new stream S2, where S2 consists of those measurements e from S1 where weight is considered too large relative to the height. Assume we know that weight−($\alpha$+$\beta$×height) is Normally distributed with mean 0, and standard deviation $\sigma$ where the parameters $\alpha$, $\beta$, and $\sigma$ have unknown values. That is, weight−($\alpha$+$\beta$×height)~N(0, $\sigma$). For an event (weight, height, ts), weight is considered too large relative to height if weight−($\alpha$+$\beta$×height)>3$\sigma$. Now we configure our stream filter F as follows:

a. input stream: S1
b. output stream: S2
c. model: weight−($\alpha$+$\beta$×height)~N(0, $\sigma$)
d. predicate: weight−($\alpha$+$\beta$×height)>3$\sigma$
e. sample-interval: 500
f. sample-size: 20

Since $\alpha$, $\beta$, and $\sigma$ are unknown at the time F is defined, F must estimate them at run time and filter out those exceptional measurements based on those estimates. The event processor may use methods similar to those described above in relation to operators for event partitioning by classification to estimate the values of $\alpha$, $\beta$, and $\sigma$.

For example, assume that the 20 events in the sample are the events shown in Table 2.

TABLE 2

| Event ID | Weight (kg) | Height (cm) |
|---|---|---|
| 1 | 38.74 | 156 |
| 2 | 35.98 | 151 |
| 3 | 79.46 | 179 |
| 4 | 29.43 | 136 |
| 5 | 58.11 | 174 |
| 6 | 76.88 | 184 |
| 7 | 74.69 | 185 |
| 8 | 74.60 | 175 |
| 9 | 51.72 | 157 |
| 10 | 57.16 | 160 |
| 11 | 44.38 | 146 |
| 12 | 56.14 | 168 |
| 13 | 47.66 | 152 |
| 14 | 78.22 | 184 |
| 15 | 71.60 | 172 |
| 16 | 63.56 | 156 |
| 17 | 70.17 | 173 |
| 18 | 43.36 | 149 |
| 19 | 52.21 | 157 |
| 20 | 72.90 | 182 |

$$\text{Let } X = \begin{bmatrix} 1 & 156 \\ 1 & 151 \\ 1 & 179 \\ 1 & 136 \\ 1 & 174 \\ 1 & 184 \\ 1 & 185 \\ 1 & 175 \\ 1 & 157 \\ 1 & 160 \\ 1 & 146 \\ 1 & 168 \\ 1 & 152 \\ 1 & 184 \\ 1 & 172 \\ 1 & 156 \\ 1 & 173 \\ 1 & 149 \\ 1 & 157 \\ 1 & 182 \end{bmatrix} \text{ and } Y = \begin{bmatrix} 38.74 \\ 35.98 \\ 79.46 \\ 29.43 \\ 58.11 \\ 76.88 \\ 74.69 \\ 74.61 \\ 51.72 \\ 57.16 \\ 44.38 \\ 56.14 \\ 47.66 \\ 78.22 \\ 71.60 \\ 63.56 \\ 70.17 \\ 43.36 \\ 52.21 \\ 72.91 \end{bmatrix}.$$

Then $\alpha$, $\beta$, and $\sigma$ can be calculated by the following formula (i.e., Maximum Likelihood Estimation or MLE).

$$\begin{bmatrix} \alpha \\ \beta \end{bmatrix} = (X^T X)^{-1} X^T Y = \begin{bmatrix} -103.06 \\ 0.98 \end{bmatrix}$$

and $\sigma$ = square-root-of $$\left( (Y - X(X^T X)^{-1} X^T Y)^T (Y - X(X^T X)^{-1} X^T Y) / (20-2) \right) = 6.24.$$

It should be noted that 1) 20 is the sample size, and 2 is the number of unknown coefficients in the model: weight−($\alpha$+$\beta$×height) (i.e., $\alpha$ and $\beta$).
2) For model: weight−($\alpha$+$\beta$×height)~N(0, $\sigma$), there is a closed form formula for MLE. However, when weight−($\alpha$+$\beta$*height)~F where F is some distribution other than Normal distribution, there may not be any closed form formula, and the event processor may have to compute the unknown parameters in the model using algorithms known in nonlinear optimization and numerical analysis.

Hence the model computed from the first 20 events shown in Table 2 is

Weight−(−103.06+0.98*Height)~N(0,6.24).

Assuming that the 21$^{st}$ event is (Weight, Height)=(87, 172), then 87−(−103.06+0.98×172)=21.5>3×6.24. Hence the 21$^{st}$ event is considered an exceptional event and is placed into the output stream S2.

Figure 9:
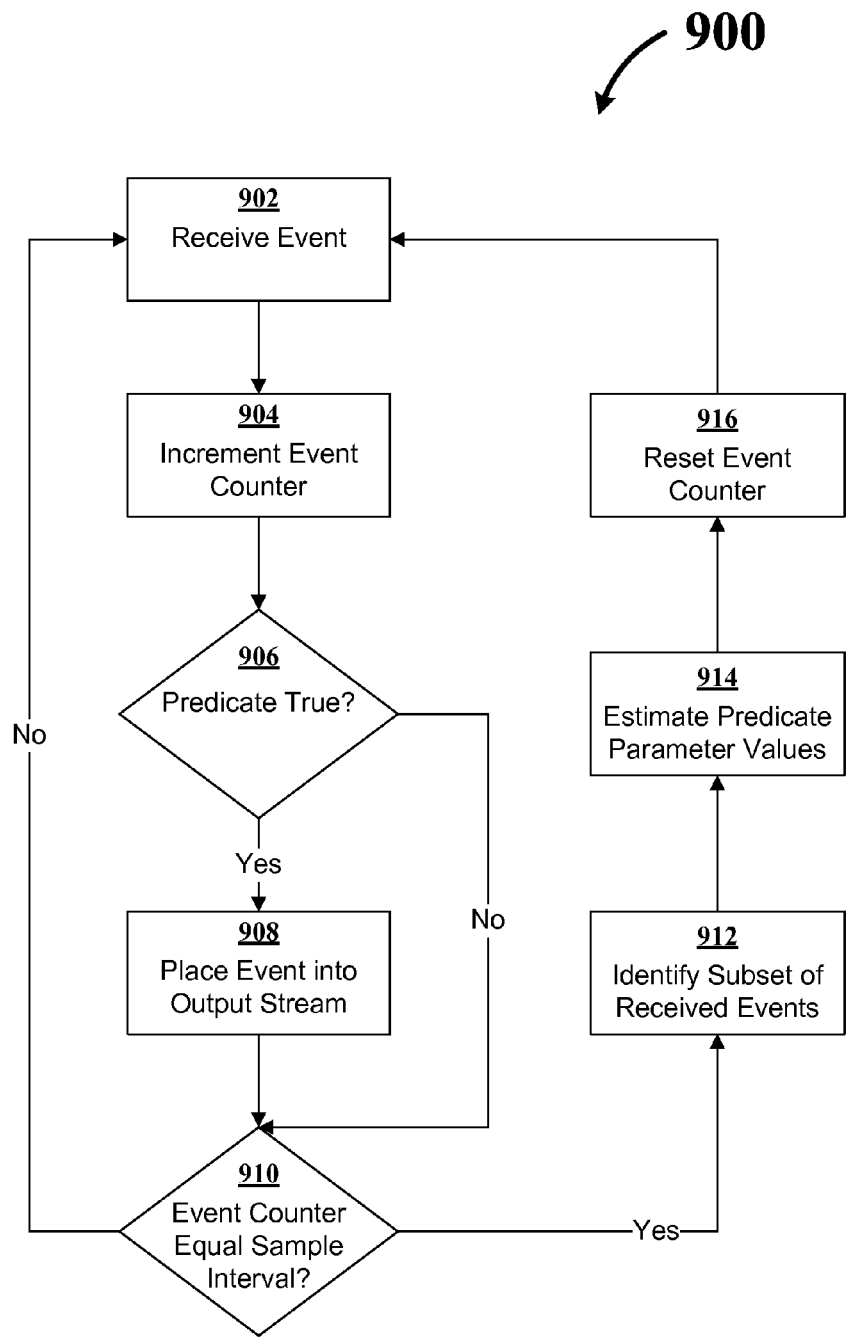
FIG. 9 illustrates a flowchart of a particular embodiment of the operator for event filtering by point estimation implemented by the procedures of FIG. 8.

FIG. 9 illustrates a flowchart 900 of a particular embodiment of the operator implemented by the procedures 800 of FIG. 8. In Step 902, an event processor embodying the operator receives an event from a stream of events. In Step 904, the event processor increments an event counter that keeps track of how many events have been received since the last time the event count was reset. In Step 906, the event processor evaluates a predicate comprising predetermined parameters. If the event processor determines that the predicate does not evaluate to true, then the event processor proceeds to Step 910. If the event processor determines the predicate evaluates to true, then the event processor proceeds to Step 908. In Step 908, the event processor places an alert event into an output stream. Upon completion of Step 908, the event processor proceeds to Step 910.

In Step 910, the event processor determines whether the event counter is equal to the sample interval. In the event counter is not equal to the sample interval, then the event processor returns to Step 902. If the event counter is equal to the sample interval, then the event processor proceeds to Step 912.

In Step 912, the event processor identifies a subset of the received events. In particular embodiments, the identified subset will consist of a number of the most recently received events equal to a predetermined sample size.

In Step 914, the event processor estimates parameter values for the predicate. The event processor performs these estimates based on the identified subset of the received events. The event processor will evaluate the predicate using these estimates for parameter values the next time the event processor performs Step 906. The event processor will continue to these estimates for parameter values when evaluating the predicate until the next time Step 914 is performed and new estimates are computed.

Upon completion of Step 914, the event processor proceeds to Step 916. In Step 916, the event processor resets the event counter. Upon completion of Step 916, the event processor returns to Step 902.

In accordance with embodiments described herein, novel event-processing operators are provided. These novel operators can be advantageously utilized in implementing event processors and event-processing systems. While inventive matter has been shown and described herein with reference to specific embodiments thereof, it should be understood by those skilled in the art that variations, alterations, changes in form and detail, and equivalents may be made or conceived of without departing from the spirit and scope of the inventive matter. The foregoing description of the inventive matter is not intended to limit the present invention. Rather, the scope of the present invention should be assessed as that of the appended claims and by equivalents thereof.

What is claimed is:

1. A method comprising:
   receiving a first stream of events;
   for each event in the received first stream of events, determining whether the event has a probability equal to or greater than a predetermined threshold of being associated with one of a plurality of classifications in accordance with a generalized linear model comprising a predetermined distribution function, a linear predictor, and a predetermined link function;
   for each event determined to have a probability equal to or greater than the predetermined threshold of being associated with one of the plurality of classifications, placing the event in an output stream along with a mark indicating the associated classification;
   for each event determined to not have a probability equal to or greater than the predetermined threshold of being associated with one of the plurality of classifications, placing the event in an output stream along with a mark indicating that the event is not associated with one of the plurality of classifications;
   receiving a second stream of events, each event in the second stream having been previously processed and marked as associated with one of the plurality of classifications; and
   based on events in the second stream, estimating unknown parameters in the linear predictor used in determining whether events in the first stream have a probability equal to or greater than a predetermined threshold of being associated with one of the plurality of classifications.

2. The method of claim 1, wherein the estimating step is performed after each time a predetermined interval-number of determining steps is performed.

3. The method of claim 1 wherein estimating unknown parameters in the linear predictor based on events in the second stream comprises estimating unknown parameters in the linear predictor based on a first sample of a number of events in the second stream.

4. The method of claim 3 further comprising, after a predetermined interval number of determining steps have been performed, estimating unknown parameters in the linear predictor based on a second sample of a number of events in the second stream, wherein the second sample is different than the first sample.

5. A non-transitory computer readable storage medium having computer executable instructions stored thereon, the computer executable instructions comprising instructions for:
   receiving a first stream of events;
   for each event in the received first stream of events, determining whether the event has a probability equal to or greater than a predetermined threshold of being associated with one of a plurality of classifications in accordance with a generalized linear model comprising a predetermined distribution function, a linear predictor, and a predetermined link function;
   for each event determined to have a probability equal to or greater than the predetermined threshold of being associated with one of the plurality of classifications, placing the event in an output stream along with a mark indicating the associated classification;
   for each event determined to not have a probability equal to or greater than the predetermined threshold of being associated with one of the plurality of classifications, placing the event in an output stream along with a mark indicating that the event is not associated with one of the plurality of classifications;
   receiving a second stream of events, each event in the second stream having been previously processed and marked as associated with one of the plurality of classifications; and
   based on events in the second stream, estimating unknown parameters in the linear predictor used in determining whether events in the first stream have a probability equal to or greater than a predetermined threshold of being associated with one of the plurality of classifications.

6. The computer readable storage medium of claim 5 further comprising instructions for estimating unknown parameters in the linear predictor after each time a predetermined number of determining steps is performed.

7. The computer readable storage medium of claim 5 wherein the instructions for estimating unknown parameters in the linear predictor based on events in the second stream comprise instructions for estimating unknown parameters in the linear predictor based on a first sample of a number of events in the second stream.

8. The computer readable storage medium of claim 7 further comprising instructions for, after a predetermined interval number of determining steps have been performed, estimating unknown parameters in the linear predictor based on a second sample of a number of events in the second stream, wherein the second sample is different than the first sample.

9. An apparatus comprising:

a processor;

a non-transitory memory unit that stores instructions executable by the processor; and an interconnect coupling the processor and the memory unit, enabling the processor to execute the instructions stored by the memory unit, wherein the processor is configured to receive a first stream of events;

for each event in the received first stream of events, determine whether the event has a probability equal to or greater than a predetermined threshold of being associated with one of a plurality of classifications in accordance with a generalized linear model comprising a predetermined distribution function, a linear predictor, and a predetermined link function;

for each event determined to have a probability equal to or greater than the predetermined threshold of being associated with one of the plurality of classifications, place the event in an output stream along with a mark indicating the associated classification;

for each event determined to not have a probability equal to or greater than the predetermined threshold of being associated with one of the plurality of classifications, place the event in an output stream along with a mark indicating that the event is not associated with one of the plurality of classifications;

receive a second stream of events, each event in the second stream having been previously processed and marked as associated with one of the plurality of classifications; and based on events in the second stream, estimate unknown parameters in the linear predictor used in determining whether events in the first stream have a probability equal to or greater than a predetermined threshold of being associated with one of the plurality of classifications.

10. The apparatus of claim 9 wherein estimating unknown parameters in the linear predictor is performed after each time a predetermined number of determining steps is performed.

11. The apparatus of claim 9 wherein estimating unknown parameters in the linear predictor based on events in the second stream comprises estimating unknown parameters in the linear predictor based on a first sample of a number of events in the second stream.

12. The apparatus of claim 11 further comprising, after a predetermined interval number of determining steps have been performed, estimating unknown parameters in the linear predictor based on a second sample of a number of events in the second stream, wherein the second sample is different than the first sample.

* * * * *